INVENTORS
RICHARD N. DOBSON
HOWARD J BEXON

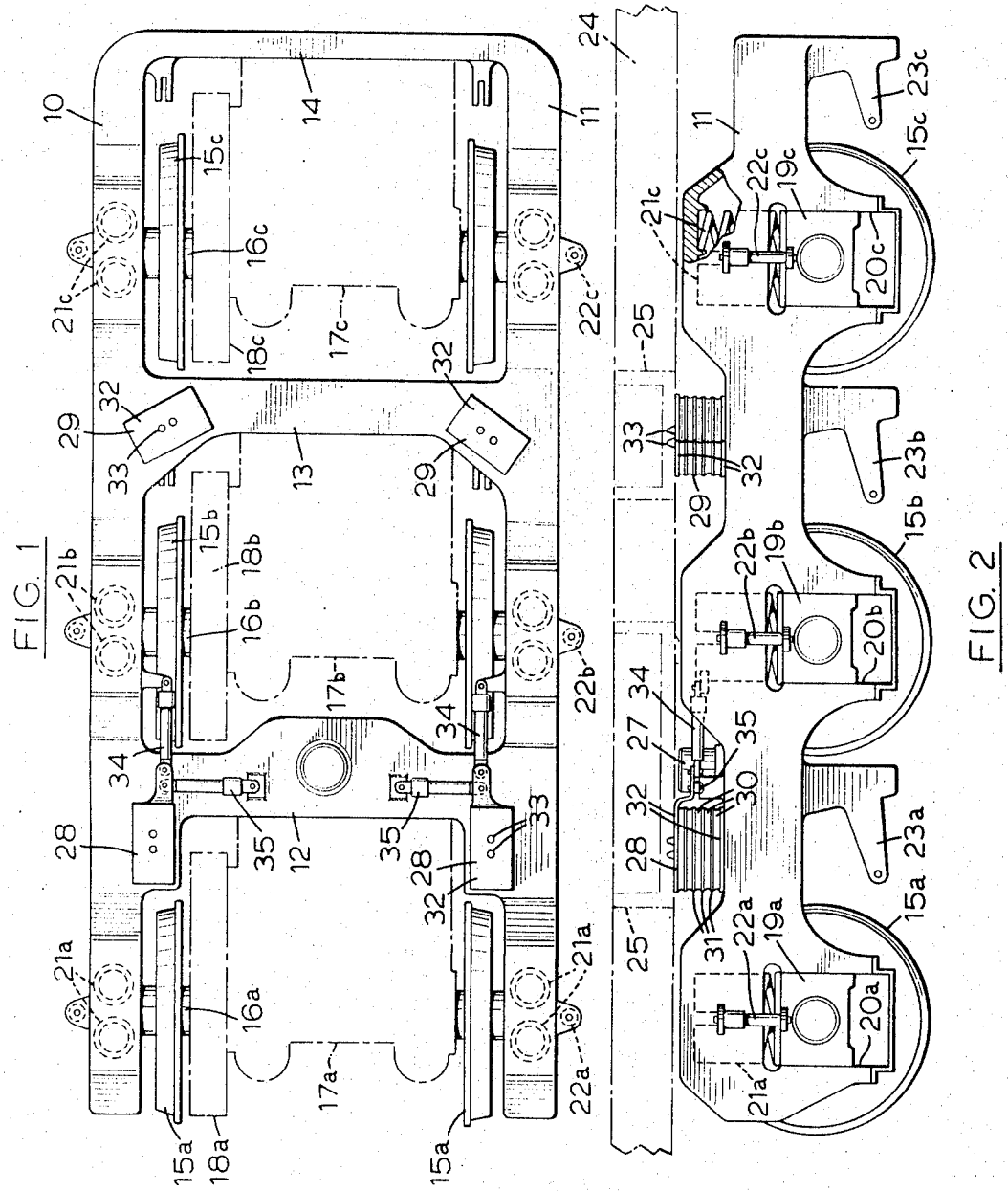

United States Patent Office 3,451,355
Patented June 24, 1969

3,451,355
LOCOMOTIVE TRUCK
Richard N. Dobson, Burlington, Ontario, and Howard J. Bexon, Oakville, Ontario, Canada, assignors to Dominion Foundries and Steel, Limited, Hamilton, Ontario, Canada
Filed Jan. 4, 1967, Ser. No. 607,325
Int. Cl. B61c 9/48; B61f 5/02
U.S. Cl. 105—136                                  8 Claims

ABSTRACT OF THE DISCLOSURE

A high adhesion truck suspension, particularly for locomotive trucks, employs a relatively soft coil spring suspension of the road wheels to the truck and a relatively stiff rubber spring suspension of the vehicle body to the truck; the vehicle body suspension consists of four units in rectangular configuration with their compression axes vertical and a non-load-bearing centre pivot, the pivot preferably being connected to the vehicle body by rubber springs with their compression axes longitudinally of the vehicle.

Background of the invention

This invention is concerned with improvements in or relating to trucks or bogies for railway vehicles, and especially, but not exclusively, to locomotive trucks of the type employing at least two electrically operated motorised wheel and axle units.

Description of the prior art

A recent trend of locomotive development has been to employ the highest possible power that can be applied to the driving wheels and transmitted to the track, without substantially exceeding the limit of adhesion of the wheels to the rails so as to avoid resultant wheel slip. To this end six axle locomotive are now common, such a locomotive having two trucks each with three axles, each axle being driven by an associated electric motor. In addition to the requirement for high adhesion there is a constant demand for improvements in such locomotives and their trucks in other aspects; in a particular they are required to have good riding qualities, especially at the higher speed of operation now considered to be standard, to have good curve negotiation qualities without damage to the wheel flanges or track, to be relatively compact, and to require a minimum amount of maintenance.

It is necessary to connect the truck and the vehicle body for relative pivoting movement, usually by means of a massive pivot boss and socket, and this pivoted connection should be as low as possible. It has therefore been proposed hitherto in a six wheel truck not to use a central bolster or pivot plate but to mount the pivotal connection on one of the two transoms that are provided between each two immediately adjacent pairs of wheels; it is then necessary to provide a suspension arrangement between the vehicle body and the other transom that will accommodate the resulting large lateral displacements. One such arrangement that has been proposed hitherto in U.S. Patent Number 2,797,649, comprises two pairs of transversely spaced cooperating rubbing plates disposed at the junction of the transom with the truck side frames, but such plates must be constantly lubricated to avoid excessive friction and consequent high resistance to pivoting. Another solution proposed in U.S. Patent Number 2,954,747, is to eliminate the pivotal connection and mount the vehicle body on the truck by four rubber spring suspension units having their compression axes directed downwardly and inwardly to a common intersection point, which point therefore lies on the effective pivotal axis of the suspension.

Summary of the invention

It is an object of the present invention to provide a new form of railway truck, and in accordance therewith there is provided such a truck comprising, a truck frame having two transversely spaced side frames and at least two longitudinally spaced transoms extending between the side frames and connecting them together, and at least two wheel and axle assemblies mounted by a primary spring suspension in the frame and on which the truck runs, the truck being characterized by the provision of a truck pivot member having a vertical pivot axis and centrally disposed on one transom for pivoting engagement with a cooperation member of the vehicle body, and of four rubber spring suspension members mounted on the frame in at least approximately rectangular configuration to be interposed between the frame and the vehicle body and constituting a secondary spring suspension for supporting the latter on the frame.

Description of the drawings

FIGURE 1 is a plan view from above of a particular preferred form of six wheel locomotive truck, showing in broken lines the outline of the motor units for driving the wheel and axle units, FIGURE 2 is a side elevation of the truck with the motor units not shown, and the side frames of the associated locomotive body shown in broken lines.

Description of the preferred embodiments

Figure 3:
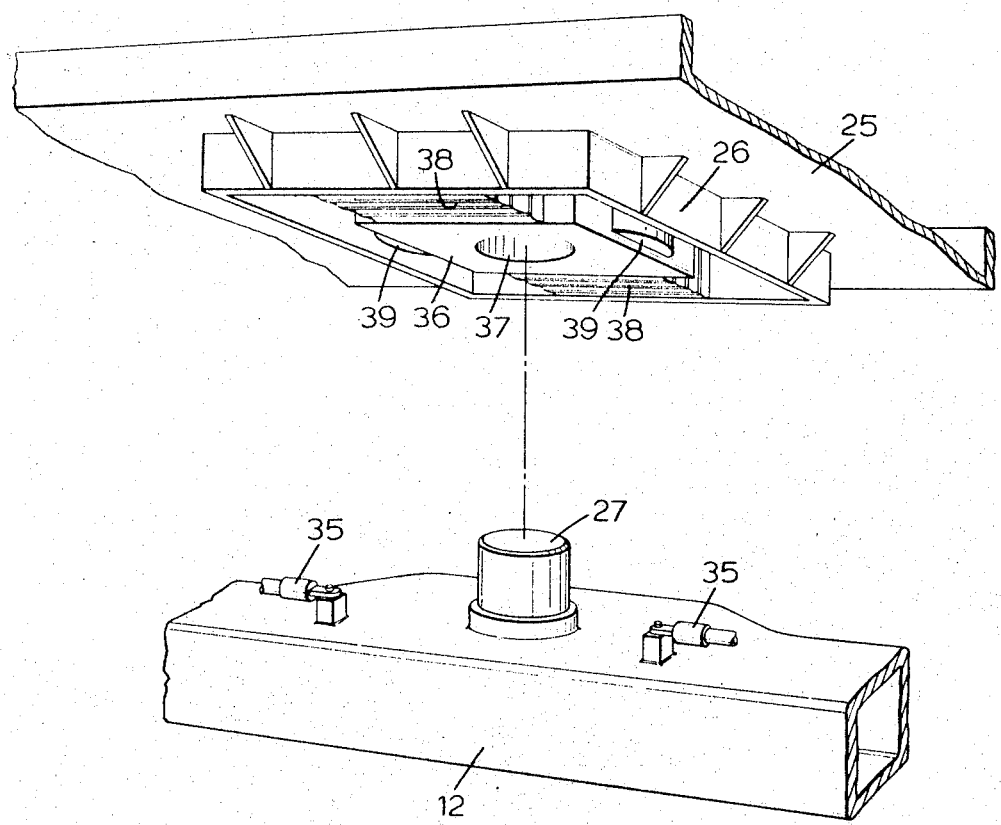
FIGURE 3 is an exploded perspective view to show more particularly the pivotal connection between the truck and the locomotive body.

The vehicle to be described as a particular preferred embodiment comprises a six-wheel locomotive truck, the frame of which is a unitary steel casting to provide the maximum rigidity, comprising two parallel side frames 10 and 11 connected to one another intermediate their ends by two transoms 12 and 13, and connected at one end by an end member 14. The truck runs on three similar motorised wheel and axle assemblies, the same parts of the assemblies having the same reference but with the respective suffix a, b or c. Thus, each assembly comprises two wheels 15 mounted on an axle 16, the axle being driven by a respective electric motor 17 via a gearbox 18. The motors are connected to the truck frame by respective usual spring-controlled shock-absorbing connections which are not specifically illustrated but will be apparent to those skilled in the art, the motors 17a and 17b being connected respectively to the transoms 12 and 13, while the motor 17c is connected to the end member 14, so that all of the motor reaction connections face in the same direction.

Each axle 16 is mounted in the side frames by respective journals 19, each of which is mounted and guided for vertical movement in a recess 20 in the respective side frame under the control of a pair of journal springs 21 and a damping device 22. The wheel suspension provided by the journal springs 21 is relatively soft with a relatively large travel (e.g. 5–6 inches) under normal loads, so that changes in axle loading due to track deflections are minimized, while the need for equalizers is eliminated and the truck body can therefore be made shorter and more compact. The hangers 23 which receive the respective brake mechanisms are shown; further detail of the brake mechanism is not given since it will be apparent to those skilled in the art.

The locomotive car body is indicated herein by two spaced parallel underframe sills 24 connected together by a cross member 25, the cross member carrying a depending housing 26 (described in detail below) that receives a centre pin 27 extending from the upper face of the main or forward transom 12. The car body is mounted on the truck by means of four interposed rubber spring suspension units 28 and 29 disposed in rectangular configuration, each being located approximately at one of the four junctions of the two transoms with the two side frames. It is however, more important that the units be disposed as symmetrically as possible relative to the centre of the truck and it will be seen that in this embodiment the units 24 are mounted somewhat forwardly of the transom 12.

Each suspension unit is of known kind comprising a plurality of flat layers 30 of a suitable rubber, or a suitable rubber-like material, interleaved with flat metal plates 31, and provided with metal end plates 32. Each end plate is provided with a pair of spigots 33 which are engaged in corresponding holes in the respective side frame or side rail, the weight of the car body being more than sufficient to maintain the required retaining engagement of the spigots in the holes. Such units operate in compression and inherently have the characteristic of a highly damped spring. They are able to accommodate relatively high shearing displacements of their end plates, the shear characteristic being controllable by control of the compression of the units along their compression axis which is perpendicular to the planes of the layers 30 and the plates 31. In this particular embodiment the units etc. are of rectangular shape in plan and the relative displacement capacity of their end plates will therefore be greater in the direction parallel to the longer sides, and less in the direction parallel to the shorter sides.

It is also preferred to space the units apart as far as possible; a sideways limit is of course imposed by the width of the truck; a lengthwise limit is imposed by the fact that the relative end plate displacement to be accommodated by each unit, as the vehicle body swivels relative to the truck, increases as the longitudinal spacing increases. A limit is set to the amount of this relative displacement, since if too much displacement takes place the units become unstable and could collapse under the compressive load.

In this embodiment the two units 28 at the junction of the main transom 12 with the side frames are disposed with their compression axes vertical and their longer sides parallel to the length of the truck, so that their displacement capacity lengthwise of the truck is greater than transversely of the truck. It has been found that suspension units having the required vertical resilience do not have sufficient damping in shear, especially in view of the changes in compression that take place in operation, and additional damping is provided. It is found most satisfactory to provide damping longitudinally of the truck frame by respective hydraulic damping units 34, and transversely thereof by respective units 35, both units being connected between suitable points on the truck frame and an extension of the upper end plate 32 of the respective suspension unit.

The two suspension units 29 associated with the rear transom 13 are also disposed with their compression axes vertical, and their longer sides are disposed perpendicular to respective radii originating from the vertical pivot axis of the centre pin 27, so that their maximum displacement capacity lies tangential to the respective radius.

Referring now especially to FIGURE 3, the housing 26 provides two sides parallel to the length of the truck and two other sides transverse thereto. A square pivot block 36 having an opening 37 therein for the reception of the pivot pin 27 is mounted in the housing, with its four sides parallel to respective sides of the housing by means of two pre-compressed rubber spring suspension units 38. The two units 38 are mounted between associated housing and block faces with their compression axes generally horizontal and parallel to the length of the car body and truck. Excessive sideways movement of the block, such as might damage or cause collapse of the units, is prevented by the engagement of bumpers 39 on the other sides of the block with the respective inner faces of the housing 26. The pivot bearing thereby provided is effectively non-load-bearing and is relatively freely displaceable to accommodate both longitudinal and transverse relative displacements of the vehicle body and the truck.

The coil springs constitute a primary spring suspension of the wheels to the truck, while the rubber spring suspension units constitute a secondary spring suspension of the vehicle body to the truck. Hitherto it has been usual practice for the primary suspension to be relatively stiff, while the secondary suspension is as soft as possible to reduce transmission of shocks and noise etc. We have found that a suspenion having superior high adhesion characteristics, and also superior riding characteristics, is obtainable by making the primary suspension relatively soft with a relatively long travel (as described above), while the secondary suspension is relatively stiff. It will be understood by those skilled in the art that the two suspensions cannot be compared directly since the primary coil spring suspension has a relatively linear characteristic, while that of the rubber spring units is relatively non-linear. They are compared herein, for the purposes of this invention, by specifying that the equivalent spring rates, and/or the equivalent static deflections, of the primary suspension relative to the secondary suspension under normal load should be at least 2:1, preferably is at least 5:1, and more preferably is at least approximately 10:1.

Because of the relatively stiff secondary suspension the vehicle body remains substantially parallel in the horizontal plane at all times to the truck, and thus to the track, despite the truck frame reaction moment due to the height of the pin 27 over the journal box centres; the wheel axles will deflect freely against the soft primary suspension and the distribution of the axle loads will not be adversely affected by the fact that the different springs 21 are at different heights, so that there will be greatly reduced weight transfer between the wheels upon acceleration and deceleration.

The combination of soft wheel suspension and stiff body suspension with a non-load-bearing, suspension-unit-controlled pivotal connection also contributes to an especially stable and smooth ride, and a further factor is the high (up to 2 inches) but controlled lateral movement that is possible by shear action in the rubber suspension units. This large lateral shear is also helpful in ensuring a good curve following characteristic for all of the wheels of the truck. The added advantages of such spring suspension units are that they provide exceptionally good insulation of the body from vibration and noise of the truck, while having no moving parts that require lubrication.

In summary, our new truck achieves superior wheel adhesion characteristics by avoiding the inherent unbalance which is introduced by the use of motors with their frame reaction connections operative in different directions, by maintaining the horizontal plane of the vehicle body frame as nearly parallel as possible to that of the truck, with the relatively stiff secondary suspension minimizing with the soft primary suspension any load difference in load distribution which would otherwise result from differences in the height of the springs 21. It should also be noted that by location of the centre of reaction on a transom between two pairs of wheel and axle units this centre is located much lower than if it were disposed at the longitudinal centre, the particular manner of mounting the pivot block permitting such an arrangement, while enabling the whole vehicle body to be displaced laterally with respect to the truck, as well as pivoting relatively thereto.

Although the invention has been described in connection with a six wheel truck with three motorized wheel and axle assemblies, it will be apparent to those skilled in the art that it is equally applicable to a four wheel truck with two motorized assemblies.

What we claim is:

1. A locomotive railway truck for supporting a locomotive vehicle body comprising, a truck frame having two transversely spaced side frames and at least two longitudinally spaced transoms extending between the side frames and connecting them together, and at least two motorised wheel and axle assemblies each mounted by a respective relatively soft primary spring suspension in the frame and on which the truck runs, the said assemblies each being connected by their respective reaction connections to the truck frame with the said reaction connections facing in the same direction, a truck pivot member having a vertical pivot axis and centrally disposed on a first one of the transoms for non-load bearing pivoting engagement with a cooperating pivot member of the vehicle body, means mounting at least one of the truck and vehicle body pivot members to permit corresponding lateral movement of said pivot axis relative to the truck or the body, four rubber spring suspension members mounted on the frame with their compression axes at least approximately vertical in at least approximately rectangular configuration to be interposed between the truck frame and the vehicle body and constituting a relatively hard secondary spring suspension for supporting the latter on the truck frame, wherein the ratio of the spring rate of said relatively soft primary suspension to that of said relatively hard secondary suspension is greater than 5:1.

2. The invention as claimed in claim 1, characterised in that the spring suspension members at the junctions of the transom having the said pivot member are provided with additional damping means operative for damping horizontal relative movement of the truck and the vehicle body.

3. The invention as claimed in claim 2, characterised in that the said additional damping means comprises two separate damping devices, each connected between the truck frame and the respective suspension means, one of said devices being operative to damp relative longitudinal horizontal movement of the truck and the vehicle body and the other being operative to damp relative transverse horizontal movement of the truck and the vehicle body.

4. The invention as claimed in claim 1, characterised in that the said cooperating pivot member of the truck body is mounted on the body between two spring suspension members having coextensive compression axes disposed horizontally and longitudinally of the truck body.

5. The invention as claimed in claim 4, characterised in that the truck body pivot member comprises a four sided pivot block and a mounting surrounding the pivot block to provide a respective mounting side substantially parallel to each pivot block side, that the two suspension members are each disposed between a respective block side and a respective mounting side, and that excessive motion of the pivot block transverse to the truck body is prevented by engagement of the other block sides with the corresponding mounting sides.

6. The invention as claimed in claim 1, characterised in that the spring rate ratio of said primary suspension to said secondary suspension is greater than 10:1.

7. The invention as claimed in claim 1, wherein the said spring suspension members have a greater horizontal displacement capacity in a first direction than in a second direction perpendicular to said first direction, and characterised in that the two members associated with the first transom are each so disposed that the said first direction extends longitudinally of the truck frame, and that the other two suspension members are each so disposed that the said first direction extends at least approximately perpendicular to a radius from the pivot axis of the said pivot member.

8. The invention as claimed in claim 1, characterised in that the truck frame is provided with an end cross member parallel to the said transoms, the truck comprises three motorised wheel and axle assemblies mounted by the truck with each transom disposed between a respective immediately adjacent pair of assemblies, and the three motors of the said assemblies are each connected by their respective reaction connections to a different one of the two transoms and said cross member with all three of the said reaction connections facing in the same direction.

References Cited

UNITED STATES PATENTS

| | | | |
|---|---|---|---|
| 1,266,565 | 5/1918 | Eaton | 105—199 |
| 2,908,231 | 10/1959 | Driemeyer et al. | 105—196 |
| 2,954,747 | 10/1960 | Hirst et al. | 105—199 |

ARTHUR L. LA POINT, *Primary Examiner.*

HOWARD BELTRAN, *Assistant Examiner.*

U.S. Cl. X.R.

105—196, 199, 453